June 24, 1930.  R. STONE ET AL  1,768,012
EGG BEATER
Filed April 8, 1929
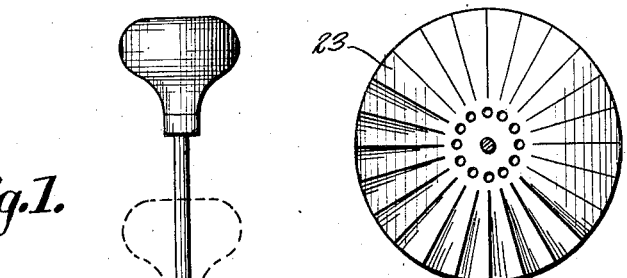
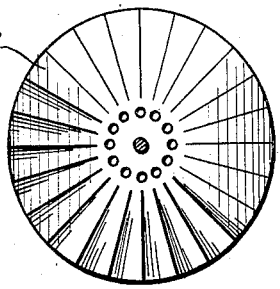
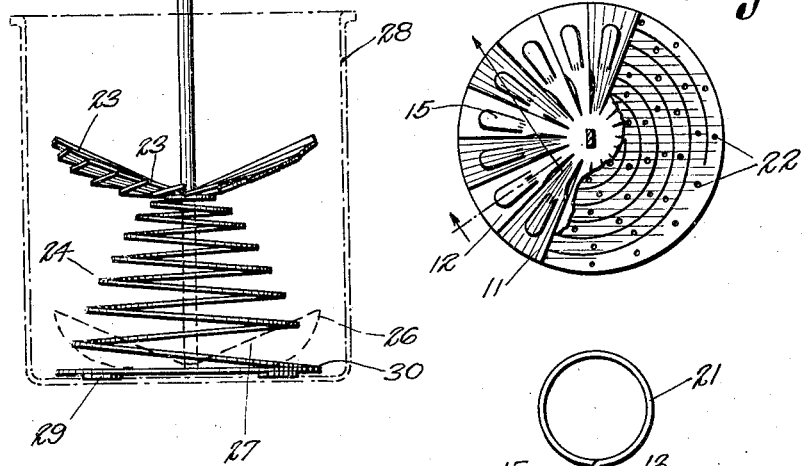
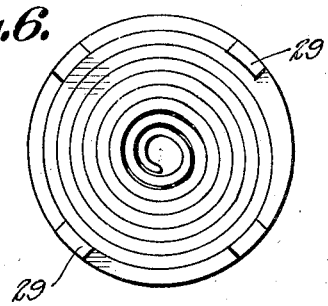
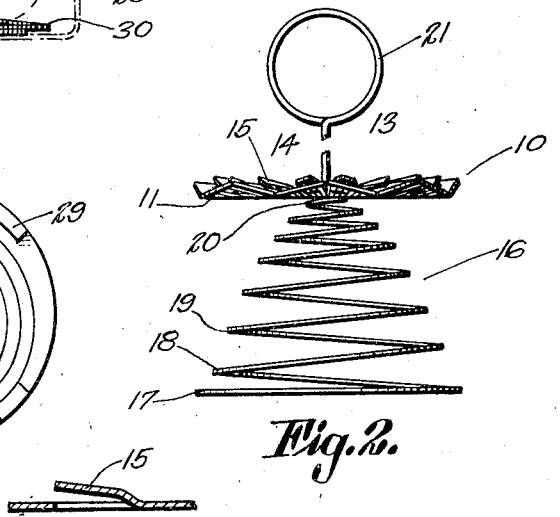
Inventors
Randolph Stone
John Cameron Patented June 24, 1930

1,768,012

UNITED STATES PATENT OFFICE

RANDOLPH STONE AND JOHN CAMERON, OF CHICAGO, ILLINOIS

EGG BEATER

Application filed April 8, 1929. Serial No. 353,628.

This invention relates to devices normally used as egg beaters or cream whippers.

An object of the invention is to provide an improved manually operable egg beater of novel construction whereby the operation of whipping cream or beating eggs in bowls or similar receptacles may be shortened as to time and be accomplished without undue splashing of the material operated upon.

Further objects will appear as the following description proceeds.

The invention is to be described with reference to a preferred embodiment shown in the accompanying drawings, in which:

Figure 1 is an elevation of one embodiment of our invention showing the egg beater within a receptacle shown in dotted lines.

Figure 2 is a foreshortened elevation of a modification of the structure shown in Figure 1.

Figure 3 is a plan of the liquid deflector of the modification shown in Figure 1.

Figure 4 is partly a plan of the liquid deflector and repeller of the Figure 2 modification.

Figure 5 is a detail view showing the relation of the base of the repeller to its first convolution.

Figure 6 is a plan of the repeller.

The liquid deflector 10 as shown in Figures 2 and 4 is preferably constructed as a disk of sheet metal having radial segments 11 defined by slits 12 in the metal. Adjacent segments such as 13 and 14 of Figure 2 may be angularly related as shown.

Carried by a segment 11 is a vane 15 shown struck up out of the metal of the segment. This construction permits passage of the liquid through the deflector and so changes the course of the liquid as the deflector moves up and down that such operations as the beating of eggs and the whipping of cream is advantageously promoted. By oppositely disposing the inclinations of vanes 15 rapidity of operation is enhanced.

Beneath the deflector 10 is a repeller 16 preferably formed as a spiral spring constructed of flat bar material or struck from sheet metal. It is substantially conical in contour as shown, having a base 17, successive convolutions 18 and 19, and a top 20.

Secured to the deflector and the spring, or repeller 16 is a reciprocator 21 adapted to be manually reciprocated vertically. When the spring 16 is compressed by downward movement of the reciprocator 21 the liquid is forced between the convolutions of the spring outwardly and successive convolutions of the spring are seated within each other in a somewhat concentric manner. The deflector 10 is repelled upwardly when pressure upon the reciprocator 21 is released.

To increase the beating and whipping action of the structure shown in Figure 2 each convolution of the repeller is provided with perforations 22 as indicated in Figure 4.

The deflector shown in Figure 1 has radial segments 23 which may have their outer ends arranged in a wavy manner as shown. The segments are inclined to promote rapid whipping action. Substantially parallel inclinations are shown.

The repeller 24 of Figure 1 is similar to that shown in Figures 2 and 4 except that it is not provided with perforations.

The dotted lines 26 and 27 indicate the position of the deflector of Figure 1 when the reciprocator 25 has fully compressed the spring 24, the convolutions of which are substantially within the same vertical confines so as to act upon all of the liquid in the receptacles 28.

Small pedestals 29 sufficiently space the base 30 from the bottom of the receptacle that all liquid must move back and forth.

The repeller presents sharp edges which promote rapid change in the viscosity of the liquid operated upon. The perforations in the repeller also cause additional sharp edges to be presented. These perforations also cause the sucking of the liquid as the repeller vibrates, or reciprocates.

By reason of the rectangular cross section of the repeller convolutions wide flat surfaces are presented to the liquid to cause a maximum quantity of the liquid to be moved at each movement of the repeller.

The structure of the deflector is such that suction and beating of the liquid is caused to take place without undesirable squirting and attendant waste. This action is accomplished with no attendant circular motion of the deflector.

The illustrative structure presents wide surfaces and sharp edges operating to break up the viscosity of material acted upon and to introduce air by suction action.

We claim:

1. An egg beater comprising, in combination, a spiral bar spring repeller of substantially conical contour and having its convolutions provided with perforations, a liquid material deflector of conical contour secured at the top of the spring, and reciprocator rigidly secured to the deflector and the top of the spring.

2. An egg beater or cream whipper comprising, in combination, a spiral spring repeller having a base and a top connected by spiral convolutions which are capable of being positioned within each other when the spring is compressed, a liquid deflector comprising radial segments having struck-out vanes, and a reciprocator secured to the spring and the deflector.

3. An egg beater comprising, in combination, a substantially conical spiral spring repeller constructed of bar material and having its enfolding convolutions provided with vertically extending perforations, spaced pedestals secured to the convolution of greatest diameter, a liquid deflector constructed of a circular disk having radially extending angularly related vanes and located at the top of the spiral spring, and a handle rigidly secured to the spring and the deflector and adapted to vertically reciprocate the deflector and the top of the spring to compress the latter and cause each convolution to become disposed substantially within the adjacent lower convolution.

4. An egg beater, comprising, in combination, a conical spiral spring embracing a conical mass of liquid to be beaten, means to act on the spring to bring the successive different diametered convolutions within substantially the same horizontal confines thereby expelling the embraced mass of liquid and a deflector movable with the topmost convolution of the spring and having upwardly and outwardly extending segments to throw the expelled liquid downwardly and outwardly as said means is acting on the spring.

5. A liquid beating device, comprising, in combination, a spiral spring repeller of conical contour having its apex above its base, a radially segmented deflector rigid with the top of the repeller and being substantially of the outline of an inverted cone, means for supporting the base of the repeller in stationary condition, means for collapsing the repeller and simultaneously moving the inverted cone deflector downward through a liquid mass as a part of that mass is expelled from within the confines of the extended repeller.

RANDOLPH STONE.
JOHN CAMERON.